United States Patent
Tortora

(10) Patent No.: US 8,942,069 B2
(45) Date of Patent: Jan. 27, 2015

(54) WEARABLE OBJECT SUCH AS A TIMEPIECE INCLUDING MEANS FOR TRIGGERING AN ELECTRONIC CONTROL FUNCTION

(75) Inventor: Pierpasquale Tortora, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 46 days.

(21) Appl. No.: 12/530,650

(22) PCT Filed: Sep. 2, 2008

(86) PCT No.: PCT/EP2008/061582
§ 371 (c)(1), (2), (4) Date: Mar. 19, 2010

(87) PCT Pub. No.: WO2009/071350
PCT Pub. Date: Jun. 11, 2009

(65) Prior Publication Data
US 2010/0296369 A1    Nov. 25, 2010

(30) Foreign Application Priority Data
Dec. 6, 2007  (EP) ..................................... 07122513

(51) Int. Cl.
G04G 21/08    (2010.01)
G01S 7/481    (2006.01)
G01S 17/02    (2006.01)

(52) U.S. Cl.
CPC ............... *G04G 21/08* (2013.01); *G01S 7/481* (2013.01); *G01S 17/026* (2013.01)
USPC ............. 368/69; 368/224; 250/221; 345/175

(58) Field of Classification Search
USPC ........ 368/69, 70, 79; 345/156, 166, 168, 170, 345/173, 175, 176
See application file for complete search history.

(56) References Cited

U.S. PATENT DOCUMENTS 3,372,789 A * 3/1968 Thiele et al. .................. 400/479
3,621,268 A * 11/1971 Friedrich et al. ........... 250/214.1

(Continued)

FOREIGN PATENT DOCUMENTS

EP    1 426 738    6/2004
EP    1 471 459    10/2004

(Continued)

OTHER PUBLICATIONS

International Search Report issued in corresponding application No. PCT/EP2008/061582, completed Feb. 2, 2009 and mailed Feb. 6, 2009.

*Primary Examiner* — Vit W Miska
(74) *Attorney, Agent, or Firm* — Griffin & Szipl, P.C.

(57) ABSTRACT

Portable object such as a timepiece including a dial (4) covered by a watch glass (2), the portable object (1) enclosing an electronic control circuit (16) for at least one time function or non-time related function, the portable object further comprising at least one light source (12) and an associated light sensor (10), which are arranged on the dial (4), the light source (12) emitting, through the glass (2), a light beam, which is at least partially reflected towards the light sensor (10), when it is intercepted by the user's finger (D) placed on the glass (2) of the portable object, the light sensor (10) supplying the electronic control circuit (16) with an electric signal for activating the corresponding function when it detects the light produced by the light source (12) and reflected by the user's finger (D), the portable object being characterized in that the light source (12) emits collimated light while forming, on the glass (2), a spot of defined dimensions which defines the place on the glass (2) where the user has to place his finger.

18 Claims, 1 Drawing Sheet

(56) References Cited

U.S. PATENT DOCUMENTS

| | | | |
|---|---|---|---|
| 4,254,333 A * | 3/1981 | Bergstrom | 250/221 |
| 4,257,115 A * | 3/1981 | Hatuse et al. | 368/69 |
| 4,340,813 A * | 7/1982 | Sauer | 250/221 |
| 4,468,131 A * | 8/1984 | Bui et al. | 368/69 |
| 4,847,606 A * | 7/1989 | Beiswenger | 345/175 |
| 5,103,085 A * | 4/1992 | Zimmerman | 250/221 |
| 5,262,636 A * | 11/1993 | Rink | 250/221 |
| 5,424,533 A * | 6/1995 | Schmutz | 250/221 |
| 5,479,007 A * | 12/1995 | Gillen et al. | 250/221 |
| 5,487,053 A * | 1/1996 | Beiswenger et al. | 368/69 |
| 5,742,564 A * | 4/1998 | Kuschel et al. | 368/69 |
| 6,052,339 A * | 4/2000 | Frenkel et al. | 368/230 |
| 6,535,694 B2 * | 3/2003 | Engle et al. | 396/263 |
| 6,707,027 B2 * | 3/2004 | Liess et al. | 250/221 |
| 6,875,977 B2 * | 4/2005 | Wolter et al. | 250/221 |
| 7,355,164 B2 * | 4/2008 | Arnold | 250/227.22 |
| 7,932,893 B1 * | 4/2011 | Berthaud | 345/157 |
| 2002/0060953 A1 * | 5/2002 | Farine et al. | 368/69 |
| 2002/0104957 A1 * | 8/2002 | Liess et al. | 250/221 |
| 2006/0152494 A1 * | 7/2006 | Liess | 345/169 |
| 2010/0079411 A1 * | 4/2010 | Lee et al. | 345/175 |

FOREIGN PATENT DOCUMENTS

| | | |
|---|---|---|
| EP | 1 808 751 | 7/2007 |
| WO | 2005/106614 | 11/2005 |

* cited by examiner

WEARABLE OBJECT SUCH AS A TIMEPIECE INCLUDING MEANS FOR TRIGGERING AN ELECTRONIC CONTROL FUNCTION

This is a National Phase Application in the United States of International Patent Application No. PCT/EP2008/061582 filed Sep. 2, 2008, which claims priority on European Patent Application No. 07122513.0, filed Dec. 6, 2007. The entire disclosures of the above patent applications are hereby incorporated by reference.

FIELD OF THE INVENTION

The present invention concerns a device for starting a function by applying a finger to the glass of a portable object such as a timepiece. More specifically, the present invention concerns a start device of this type that uses optical means.

BACKGROUND OF THE INVENTION

Wristwatches are already known wherein the glass is provided with touch keys for electronically starting a time function or a non-time related function. These touch keys are structured by transparent conductive material evaporation techniques on the inner surface of the glass which is opposite the watch dial. These keys are for example capacitive keys. In other words, when the user applies his finger on the watch glass, there is a variation in the capacitance of the capacitor formed between the finger and the glass, which is interpreted by the watch electronics as a control signal for the function associated with the touch key that has been activated.

Techniques for structuring transparent touch keys on a watch glass are now well understood. They remain, however, long and thus expensive to implement. Another drawback of the touch keys briefly described above is that they cannot be activated when the watch is in water.

It is an object of the present invention to overcome the aforementioned problems, in addition to others, by proposing a new type of device for starting an electronic function in a portable object such as a wristwatch, which is much simpler to install and therefore less expensive.

SUMMARY OF THE INVENTION

The present invention therefore concerns a portable object such as a timepiece that includes a dial covered by a watch glass, said portable object enclosing an electronic circuit for controlling at least one time function or non-time related function. The portable object also includes at least one light source and an associated light sensor which are arranged on the dial, with the light source emitting, through the glass, a light beam which is at least partially reflected towards the light sensor when it is intercepted by the user's finger, placed on the glass of said portable object. The light sensor supplies an electric signal to the electronic control circuit to activate the corresponding function when it detects the light generated by the light source and reflected by the user's finger. The portable object is characterized in that the light source emits collimated light forming a spot of defined dimensions on the glass, which defines the place on said glass where the user has to place his finger.

Owing to these features, the present invention provides a portable object such as a timepiece whose means for controlling a time function or any other non-time related function include a source that transmits collimated light forming a spot of well defined dimensions on the glass enabling several of these sources to be combined to control various functions without any risk of the sources interfering with each other. The light source and the light sensor are inexpensive components and are easy to install in a watch, which means that substantial savings can be made in terms of production costs. Moreover, these means of controlling an electronic function can be used in all circumstances, in particular when the water-resistant timepiece is in water.

According to a complementary feature of the invention, the portable object includes start means that the user has to activate for the light source to transmit light. Thus the light source only emits light when it has been activated by the user beforehand. This therefore avoids having to leave the light source constantly on, which means that particularly significant energy savings can be made in the case of a watch or mobile telephone whose energy reserves are limited, and prevents a function being inadvertently switched on.

According to another feature of the invention, the portable object has as many pairs of light source/light sensors as there are functions to be controlled in the portable object.

According to yet another feature of the invention, if the portable object is a timepiece, it includes an hour hand and a minute hand, which move above the dial and which are placed in a position such that they do not cover the light source/light sensor pair(s) when the light source is activated.

According to yet another feature of the invention, the light source is a vertical cavity surface-emitting laser (VCSEL), which emits collimated light. The light power produced by the laser source is typically less than or equal to 1 mW to avoid posing a danger to the user's sight. Laser sources produced by Avalon Photonics Ltd could advantageously be used.

According to yet another feature of the invention, the light sensor is a photodiode. The photodiode and the laser source are mounted side by side on the dial of the portable object. According to a variant, the photodiode and the light source are mounted side by side on the same printed circuit board, which is itself fixed to the dial or integrated therein.

BRIEF DESCRIPTION OF THE DRAWINGS

Other features and advantages of the present invention will appear more clearly from the following detailed description of an embodiment of the portable object according to the invention, this example being given purely by way of non-limiting example, with reference to the annexed drawing, in which.

DETAILED DESCRIPTION OF THE ILLUSTRATIVE EMBODIMENTS

The present invention proceeds from the general inventive idea that consists in replacing, for example in a watch, touch keys for controlling an electronic function of the watch by control means that use light propagation and reflection principles. These control means rely on discreet, inexpensive, low energy consuming components that are practically invisible to the naked eye. They therefore form an interesting alternative to touch keys, which are complex and thus expensive to structure on the inner surface of a watch glass and which also have the drawback of not working in all circumstances, in particular in water. For these control means to be able to work properly, a collimated light source is used that forms a spot of well defined dimensions on the glass, enabling several of these sources to be combined for controlling different functions without any risk of the sources interfering with each other.

The present invention will be described with reference to a portable object of the timepiece type. It goes without saying that this example is given purely by way of illustration and that the invention can be applied to other portable objects such as, in particular, a mobile telephone.

Figure 1:
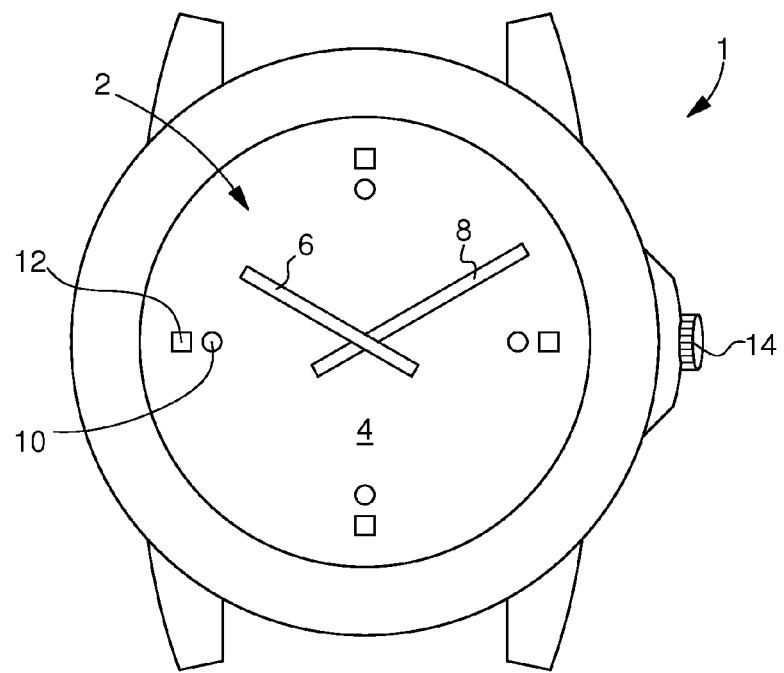
FIG. 1 is a top view of a timepiece according to the invention.

Designated as a whole by the general reference number 1, a top view of a timepiece in accordance with the present invention is shown schematically in FIG. 1. This timepiece 1, which may be of the wristwatch type, essentially includes a glass 2 arranged above a dial 4 and between which an hour hand 6 and a minute hand 8 move. The control means according to the invention are formed by at least one light source 10/light sensor 12 pair.

In the example shown in FIG. 1, the control means according to the invention include four light source 10/light sensor 12 pairs, which are respectively placed at midday, 3 o'clock, 6 o'clock and 9 o'clock and which each control an electronic time function or any other electronic function not related to the time. In the position illustrated in FIG. 1, hour hand 6 and minute hand 8 show 10:10. Hands 6, 8 come into this position when the user has activated the start means for light sources 10, such as a push-button 14. Indeed, in this position, hands 6, 8 do not cover any of the light source 10/light sensor 12 pairs and thus cannot prevent them from operating properly. It will be noted that, advantageously, light sources 10 only start to emit light after the user has activated start means 14, which enables substantial energy savings to be made during the periods when the user does not need to access the control functions of watch 1 and when light sources 10 are switched off. This is particularly advantageous as the energy reserves of a wristwatch are necessarily limited and prevent a control function being inadvertently activated.

Figure 2:
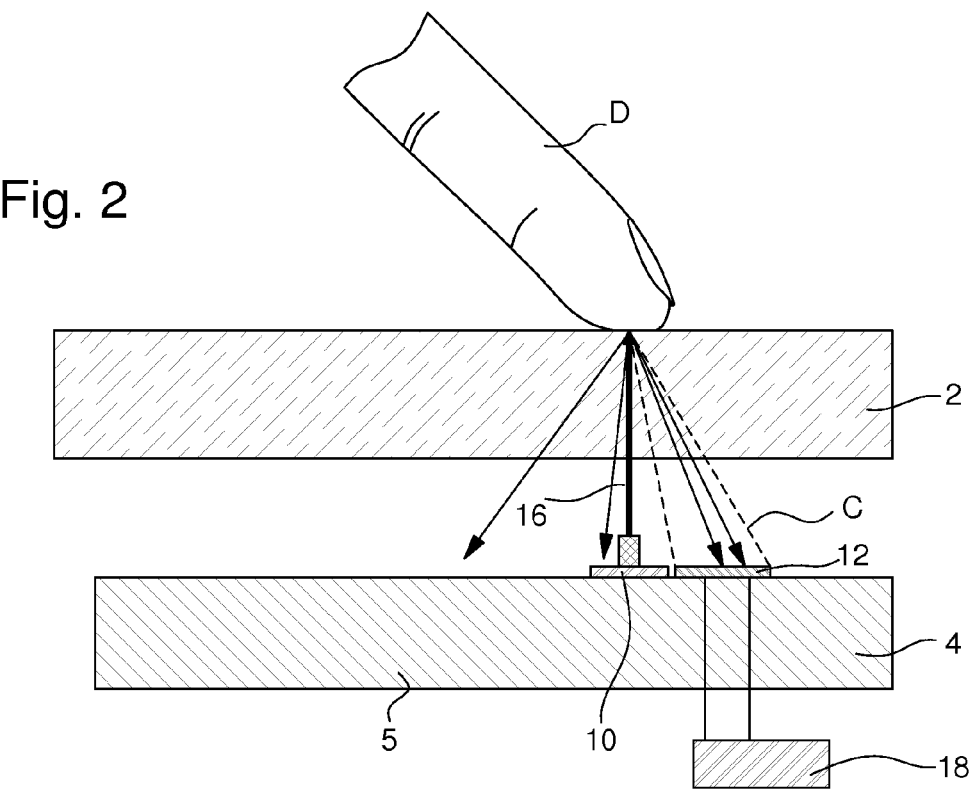
FIG. 2 is a schematic diagram of the means for controlling an electronic function of a timepiece according to the invention.

As seen in FIG. 1 and better still in FIG. 2, a light source 10 and its associated light sensor 12 are mounted side by side on the surface S of dial 4. In the example shown, these two elements 10, 12 are mounted directly on surface S of the dial. According to a variant that is not shown, one could also envisage mounting each light source 10/light sensor 12 pair on a printed circuit board so as to form a module that could then be fixed to the surface S of dial 4. Mounting the lights sources and light sensors in pairs on printed circuit boards simplifies assembly in that complete modules, rather than separate elements, are fixed to dial 4. According to yet another variant, it would also be possible to make apertures in dial 4 into which a light source 12 and its associated light sensor 10 could then be inserted.

Light source 12 may be a simple light emitting diode. However, a VCSEL is preferably used, such as those marketed by Avalon Photonics Ltd. Indeed, this type of laser microcavity emits collimated light vertically upwards, i.e. perpendicular to surface S of dial 4 in the direction of glass 2, forming a spot of reduced size on the glass that clearly defines the place on said glass where said user will have to place his finger. A "collimated light source" is a source that emits a light beam that is as little divergent as possible so as to form a spot of very reduced dimensions on the watch glass. By way of example, the divergence of the laser beam produced by the microcavity may be 24°, which means that, if the glass is arranged 5 mm above said microcavity, the light spot at its surface will have a dimension of only 2 mm. There is thus no risk of the light produced by a laser microcavity disturbing the light sensor associated with another microcavity. The wavelength of the light produced is within the infrared range, in other words it is invisible to the human eye, and the light power is preferably less than or equal to 1 mW. The optical power value involved in the present invention is thus sufficiently small to present no danger for the user's sight. A VCSEL laser is of much smaller dimensions than a laser diode. By way of example, the surface occupied by a laser microcavity and its associated light sensor is of the order of 200 $\mu m^2$, which makes this assembly practically invisible and is not detrimental to the aesthetic appearance of the watch dial. One could thus envisage concealing the assembly formed by the light source and its photosensor in the middle of the letters distributed over the dial to indicate the name of the function associated with the assembly.

Light sensor 10 is preferably a photodiode which is characterised by an acceptance cone C whose geometry defines the conditions on the limits between the light that will fall into the cone and be converted into a current by the photodiode, and the light that passes outside the limits of said cone and which will not therefore be useful for said photodiode. The dimensions of the photodiode which determine the aperture of the acceptance cone and the space between the photodiode and the laser microcavity can be chosen such that the system response is optimum when the user's finger D is just in contact with glass 2.

The operating principle of the system according to the invention is as follows. After the user has pressed on push-button 14, laser microcavity 12 emits an infrared light beam 16 vertically upwards. If no obstacle intercepts light beam 16, the light is free to follow its path beyond glass 2 and photodiode 12 does not emit any signal. If, on the contrary, the user applies his finger D to glass 2 in the zone illuminated by the infrared light beam 16, one part of the light intercepted by the user's finger D is diffused and reflected backwards towards dial 4. The fraction of light that falls into acceptance cone C of photodiode 10 will be converted by said photodiode 10 into a current signal, which will be applied to an electronic control circuit 18, which will use this electric signal to activate the corresponding time function or non-time related function.

It goes without saying that the present invention is not limited to the embodiment that has just been described and that those skilled in the art could envisage various simple alterations and variants without departing from the scope of the invention as defined by the associated claims. In particular, one could envisage applying the present invention to a portable object of the mobile telephone type. Preferably, the light source and the light sensor will be housed in a water-resistant volume, which means that the portable object according to the invention can be used underwater.

The invention claimed is:

1. A portable object comprising:
   (a) a dial covered by a glass;
   (b) an electronic control circuit for at least one time function or non-time related function, wherein the electronic control circuit is enclosed by the portable object; and
   (c) at least one light source and an associated light sensor, wherein the at least one light source and associated light sensor are arranged on the dial, wherein the light sensor defines an acceptance cone, wherein the geometry of the acceptance cone defines a limit between light that falls into the cone and is converted into a current by the light sensor, and light that passes outside the limit of the acceptance cone, wherein the light source is disposed to emit a light beam through the glass, wherein the light beam is at least partially reflected towards the light sensor when it is intercepted by a user's finger placed on a spot of defined dimension on the glass of the portable object, wherein the light sensor is connected to supply the electronic control circuit with an electric signal that activates a function when the light sensor directly detects light that is produced by the light source and directly reflected by the user's finger into the acceptance cone, wherein the light source is disposed to emit collimated light forming the spot of defined dimensions on the glass, and wherein the spot defines a place on the glass for the user to place a finger.

2. The portable object according to claim 1, wherein the portable object includes a start means that the user has to activate for the light source to emit light.

3. The portable object according to claim 2, wherein the start means are formed by a push-button.

4. The portable object according to claim 1, wherein the portable object includes as many light source/light sensor pairs as there are functions to be controlled in said portable object.

5. The portable object according to claim 1, wherein the portable object includes an hour hand and a minute hand, which move above the dial and which are placed in a position such that they do not cover the light source/light sensor pair(s) when the light source is activated.

6. The portable object according to claim 1, wherein the light source is a vertical microcavity laser, which emits collimated light whose wavelength is located within the infrared range.

7. The portable object according to claim 6, wherein the light power produced by the microcavity laser is less than or equal to 1 mW.

8. The portable object according to claim 6, wherein the light sensor is a photodiode.

9. The portable object according to claim 7, wherein the light sensor is a photodiode.

10. The portable object according to claim 8, wherein the photodiode and the microcavity laser are mounted side by side on the dial of the portable object.

11. The portable object according to claim 9, wherein the photodiode and the microcavity laser are mounted side by side on the dial of the portable object.

12. The portable object according to claim 8, wherein the photodiode and the microcavity laser are mounted side by side on the same printed circuit board, which is itself fixed to the dial or integrated therein.

13. The portable object according to claim 9, wherein the photodiode and the microcavity laser are mounted side by side on the same printed circuit board, which is itself fixed to the dial or integrated therein.

14. The portable object according to claim 10, wherein the photodiode and the microcavity laser are mounted side by side on the same printed circuit board, which is itself fixed to the dial or integrated therein.

15. The portable object according to claim 11, wherein the photodiode and the microcavity laser are mounted side by side on the same printed circuit board, which is itself fixed to the dial or integrated therein.

16. The portable object according to claim 12, wherein the photodiode and the microcavity laser are mounted side by side on the same printed circuit board, which is itself fixed to the dial or integrated therein.

17. The portable object according to claim 1, wherein the light source and the light sensor are housed in a water-resistant volume.

18. The portable object according to claim 1, wherein the portable object is a timepiece.

* * * * *